United States Patent [19]

Stanhope

[11] Patent Number: 4,583,321

[45] Date of Patent: Apr. 22, 1986

[54] SPACE GARDEN

[76] Inventor: Lawrence E. Stanhope, c/o Connolly and Hutz, P.O. Box 2207, Wilmington, Del. 19899-2207

[21] Appl. No.: 599,704

[22] Filed: Apr. 12, 1984

[51] Int. Cl.[4] ............................................. A01C 1/00
[52] U.S. Cl. ............................................. 47/58; 47/17
[58] Field of Search .................... 47/1, 1.1, 1.4, 17, 47/65; 136/292, 245, 252; 198/472, 742; 244/159, 173, 158

[56] References Cited

U.S. PATENT DOCUMENTS

| | | | |
|---|---|---|---|
| 1,121,722 | 12/1914 | Fessenden | 47/17 |
| 3,362,104 | 1/1968 | Oswald et al. | 47/1.4 X |
| 3,544,041 | 12/1970 | Billerbeck et al. | 136/292 X |
| 3,749,332 | 7/1973 | Gray | 47/1.4 X |
| 4,068,405 | 1/1978 | Campbell et al. | 47/65 |
| 4,194,614 | 3/1980 | Hrivnak | 198/742 X |

FOREIGN PATENT DOCUMENTS

129840  8/1900  Fed. Rep. of Germany .......... 47/17

Primary Examiner—Robert A. Hafer
Assistant Examiner—Danton DeMille
Attorney, Agent, or Firm—Connolly and Hutz

[57] ABSTRACT

A space garden for growing plants in space comprises a space station in the form of a sealed housing which is divided into a plurality of levels. At least a portion of the top wall of the housing is transparent to permit sunlight to enter therein so that the top level could function as a light growing area whereas at least one of the lower levels is a dark growing area. Plants are periodically rotated to and from the light and dark growing areas.

15 Claims, 15 Drawing Figures

SPACE GARDEN

BACKGROUND OF INVENTION

There is presently a race into space by various countries which has resulted in the expenditure of billions of dollars on flights to the moon, to other planets and to outer space. As a result, the technology involved in space flight has reached a stage where space shuttles are becomming commonplace. The investigation into space is of interest not only for the sake of scientific curiosity but also because space provides the possibility of having an environment which can be better controlled by avoiding the contaminations such as pollution existing on earth. As a result, space experiments have included a wide variety of different facets involved in the ability of man to exist in space.

Totally apart from the rapid development of technologies involving outer space and the immense expenditures attendant therewith, the earth itself is plagued with nagging historical problems. Notably one of these problems is the necessity to provide enough health food to feed the inhabitants of earth. In the period of scientific achievement in outerspace there exists conditions of starvation, malnutrition and other problems associated with food shortage. Much effort has been directed to alleviating these food related problems by maximizing to the extent possible the growing conditions for providing an adequate supply of health food. A deficiency in this basic approach, however, is that attention has been focused on using the earth as the environment for growing crops. The inherent disadvantage with confining growing efforts to earth, however, is that earth, by the nature of its inhabitants, creates a far less than ideal environment for crops.

SUMMARY OF INVENTION

An object of this invention is to provide a source of healthy food by utilizing existing space technology to provide a space garden in which the crops can be grown in an environment totally independent of the earth's pollution.

In accordance with this invention, a space garden is formed as a sealed housing having a plurality of levels therein. The space garden is preferably located in the stratosphere zone about eight miles or more above the earth's surface. Thus the space garden is located above the influence of the earth's turbulent, changing, destructive polluted atmosphere. The space garden is oriented so that its top wall is positioned toward the sun and its bottom wall toward the earth. The housing is formed with a plurality of levels, the uppermost of which is maintained in constant sunlight by forming at least a portion of the top wall from a transparent material. At least one lower level is maintained in darkness by being shielded by the upper level. In this manner it is possible to cyclically rotate plants to and from light and dark growing areas.

The top wall of the space garden may incorporate solar cells which could be utilized for providing needed heat and power. One of the lower levels of the space garden may comprise living quarters for the workers. The housing would also be provided with at least one air lock chamber to permit the docking of capsules.

DETAILED DESCRIPTION

In my prior Pat. Nos. 2,805,518 and 3,461,605 I described greenhouses which incorporate a plurality of levels of growing areas including means for rotating the plants from one growing area to another. The prior patents describe such greenhouses which would be located on earth. The present invention is directed to a space garden. Some of the concepts, however, of my prior patents can be utilized in the present invention. Accordingly, the details of those patents are incorporated herein by reference thereto.

The present invention provides a space garden which removes the gamble out of farming by growing plants not on earth but in space, independent of all the variables existing on earth which adversely influence earth gardens. Since ninety-nine percent of the earth's atmosphere is in the first twenty miles above the earth, the space garden is preferably located at least eight miles above earth. By having the space garden at this location, the earth below would rotate on its axis while the space garden is relatively stationary above the earth. This is done by flying the space garden due west when at the equator at the same speed that the earth is rotating on its axis (i.e., east 1000 miles per hour). On about November 22 the sun goes into the northern hemisphere and the space garden must start slowing down and fly slightly north of due west until about June 21 (to equal earth's speed at that latitude) so that the space garden is always directly between the sun and earth for full sunshine. On June 22 the space garden starts speeding up slightly and flies slightly south of west until about September 21 when it is over the equator again travelling at 1000 miles per hour again due west as the earth is rotating the same speed due east. The space garden still flies slightly south of west but starts slowing down slightly as it leaves the equator until about December 21 (as it did when going north of the equator).

The space garden could be constructed on earth and placed in its desired location using suitable techniques of space technology. For example, the space garden housing could be flown straight up to the desired altitude. The correct altitude is selected to give the plants the correct amount of sunshine and also to utilize the rays from the sun to charge batteries for the space garden by solar cells located in the top wall of the housing. Any suitable means may be used to maintain the space garden as its desired altitude such as through the use of jets, rockets, air ballons, etc. Garden 10 may also be provided with wings 41 for additional lift. Similarly one side of garden 10 may be lower than the other side to create a pitch which will help offset gravity.

It is also preferred to locate the space garden above the equator around March 21 and September 21 and north of the equator when the sun goes north and similarly just south of the equator when the sun goes south. In this manner, the space garden is in perpetual sunshine. The space garden would travel with the earth in its annual orbit around the sun but would have no seasons, only sunshine and a constant temperature. If it is found that it is too hot for the particular plants on level 20, the space garden can be flown at one side (i.e., east, west, north or south) of being directly below the sun for slanting and therefore less intense rays. By locating the garden in space, the garden is maintained free from earthquakes, erupting volcanos, floods, pollution as well as the danger of nuclear war destruction. The growing medium, air and water used in the space garden, would not be contaminated since only pure growing medium (perlite, vermiculite, moss, etc.,) and air and water would be used. Thus all plants would grow in a sterilized growing medium. Pure water could be obtained from the rain in cumulus clouds. When a cumulus or rain cloud is seen approaching and after the pollution is rained out of the bottom portion of the cloud, a tank in a capsule would be lowered a suitable distance such as a few miles below the cloud to catch the water that has been energized by the sun's rays shining on the top of the cloud. It is thus expected that very little water would be required. Working conditions would be maximized because the plants would use the carbon dioxide exhaled from the workers while giving off oxygen needed by the workers. Supplementary air, if desired, could be provided from oxygen or air sources in the manner used in present day space crafts. As later described, the workers would remain in the shade and not walk among the plants, but rather the plants would be brought to the workers. Replenishment of supplies for space garden 10 and earth travel by the workers could be achieved on a regular basis through the use of pressurized capsules 12 insulated against heat, air and water loss similar to the use of capsules docking with larger satellites as is presently known.

As shown in FIGS. 1-4, the space garden 10 is in the form of a sealed housing having a top wall 14, side walls 16 and a bottom wall 18. The housing is divided into a plurality of horizontal levels. Specifically, in the illustrated embodiment, a topmost level 20 would function as a light growing area while lower levels 22, 24 would function as dark growing areas. A fourth growing level 26 would be provided as later described, and the lowermost level 28 would also be provided as later described and could include the living quarters for the workers.

At least a portion and preferably all of top wall 14 would be transparent. Top wall 14 would include a plurality of solar cells 30 to collect the energy of the sun for generating electricity, heat, light and power. Solar cells 30 would be mounted in suitable material such as mylar, Plexiglas or other transparent plastic material.

In general, beds with plants would be located in rows on top growing area 20 so as to be in the light of the sun. Dark growing areas 22, 24 would also include rows of plant beds, and transport means such as elevators would be located at each end of each set of growing levels to permit rotation of the plants to and from the light and dark growing areas for each row. Growing areas 22, 24 could function in conjunction with light growing area 20 to permit the periodic rotation of the plants on those levels. Lower area 26 could be used for plants in their dormant stage or in their fruit growing stage or in their fruit harvesting stage. Ideally lower growing area 26 would be suited for fruit trees and grapevines which do not rotate. Areas 20, 22, 24 and 28 would preferably be seven feet high. Area 26, however, would be twelve feet high to provide room for the growing medium as well as growing room.

Space garden 10 could be of any suitable dimensions adapted to use known technology for permitting the space garden 10 to be transported to its desired location above the earth and then maintained in its desired position. For example, space garden 10 may have a width and length of 105 feet each with a height of 40 feet thus providing about one-quarter acre for each growing level. It is also to be understood that any suitable number of growing levels may be used. It is essential, however, that there be at least two growing levels since plants not only require light but must also have a dark, cooler period to rest and grow. If only two levels are used, the plants would have an equal amount of sunlight and of dark growing period. Three levels, however, would increase the amount of dark growing period, while four levels would increase the amount even more. The lower levels 22, 24, 26 may also be provided with artificial lights 34 which may be actuated when desired. The temperature in the various growing levels could be controlled. By the nature of the construction of space garden 10 with its transparent top wall 14, the upper growing level 20 which is in direct sunlight would be of a higher temperature than lower levels which are shaded by the beds in upper level 20. Desirably, upper level 20 would have a temperature of about 95° F. while the lower levels would be about 65° F. The provision of electric lights, for example, would affect the temperature in the lower levels. Plants in the light growing area grow very little, but the roots take up moisture and fertilizer in going through the photosynthesis process. Growth of the plants in the dark growing areas can be affected by the amount of time of rotation into the light growing areas and by the provision of artificial lights 34.

One, two or more sections of five foot width (i.e., each having forty beds) may be modified to grow root crops, grains, lettuce, cabbabe, cauliflower, broccoli, spinach, squash, flowers, etc., by adding another removable floor thus creating an extra tier for that section. This doubles the growing area for that section which could result in six levels. Each bed would be on level 20 the same length of time but on the other five levels the time would be increased for electric light and/or dark periods. All elevators would move less distance. Beds would still be the same size. The same assembly on the main drive shaft would work and every four hours a level would be changed. Every row of beds would remain the usual four hours on level 20 and twenty hours on the lower levels. This procedure would make it more profitable to grow every kind of product for the inhabitants of the space garden.

Figure 5:
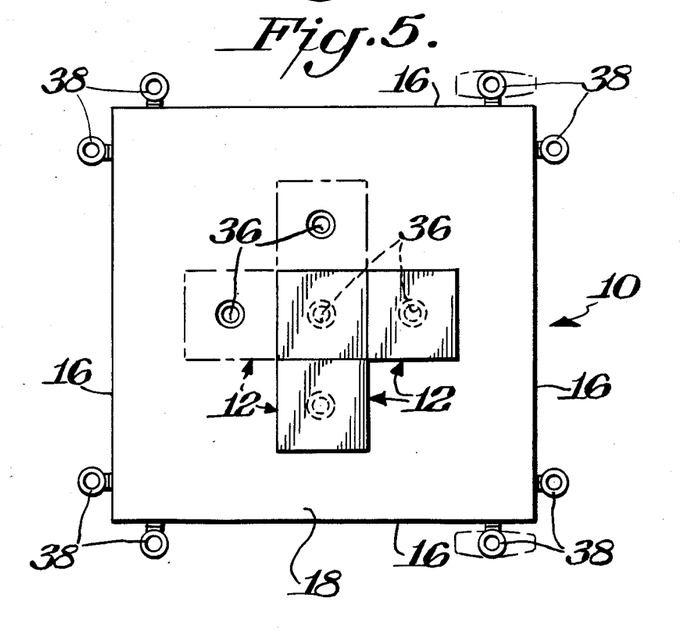
FIG. 5 is a bottom plan view of the space garden shown in FIGS. 1-4.

It would be expected that only about six workers would be required to efficiently operate space garden 10. All of their food could be provided from the growing area themselves, while the lowest level 28 would provide the living quarters for the workers. The crop resulting from plants in the growing area could be periodically loaded into space capsules 12 for transport back to earth. Lower wall 18 of housing 10 could include any suitable number of airlock chambers 36 (FIG. 5) to accommodate the docking of space capsules 12. FIG. 5, for example, illustrates the provision of five such airlock chambers 36.

Figure 1:
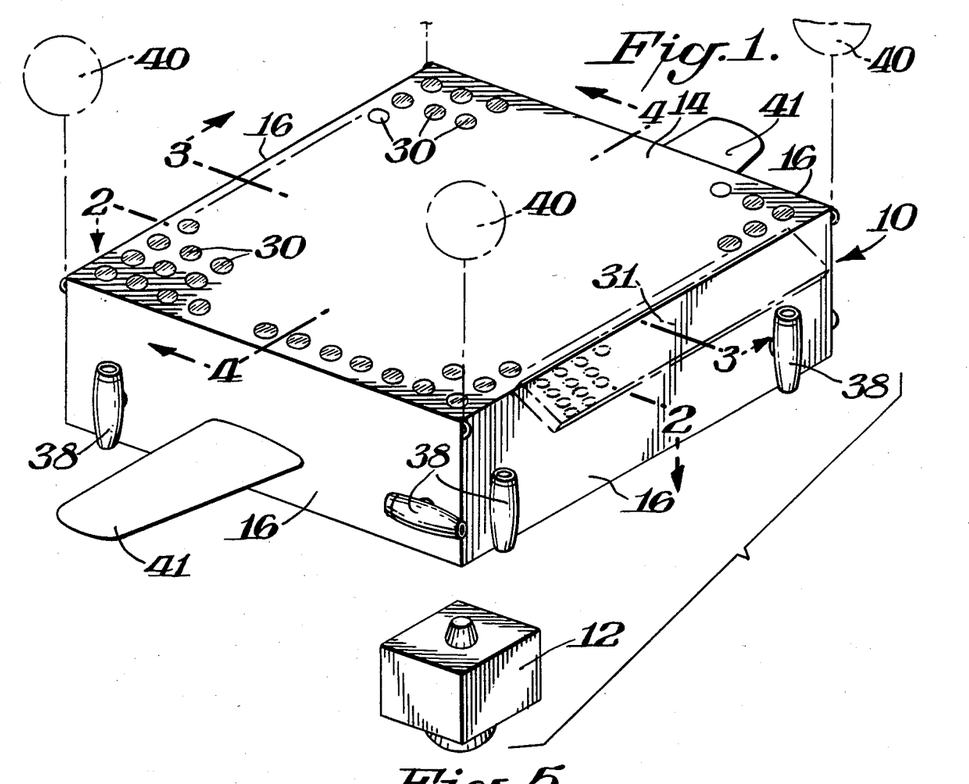
FIG. 1 is a perspective view of a space garden in accordance with this invention.

FIG. 1 also illustrates the provision of rockets or jets 38 and balloons 40 which may be utilized to maintain space garden 10 at its desired location above the earth. For clarity of illustration balloons 40 are illustrated above space garden 10. In actual practice, however, balloons 40 would be at the sides and bottom of space garden 10 so not to cast a shadow on top wall 14.

The side walls 16 and bottom wall 18 of space garden 10 would be made of insulated material and housing 10 itself would be sealed to prevent against loss of heat, air and moisture. By orienting top wall 14 perpendicular to the rays of the sun, full use would be made of the rays of sun while at the same time avoiding the creation of shadows within space garden 10.

Lower level 28 could also be used for cuttings and for mature plants as well as for general storage.

Figures 7, 8, 11:
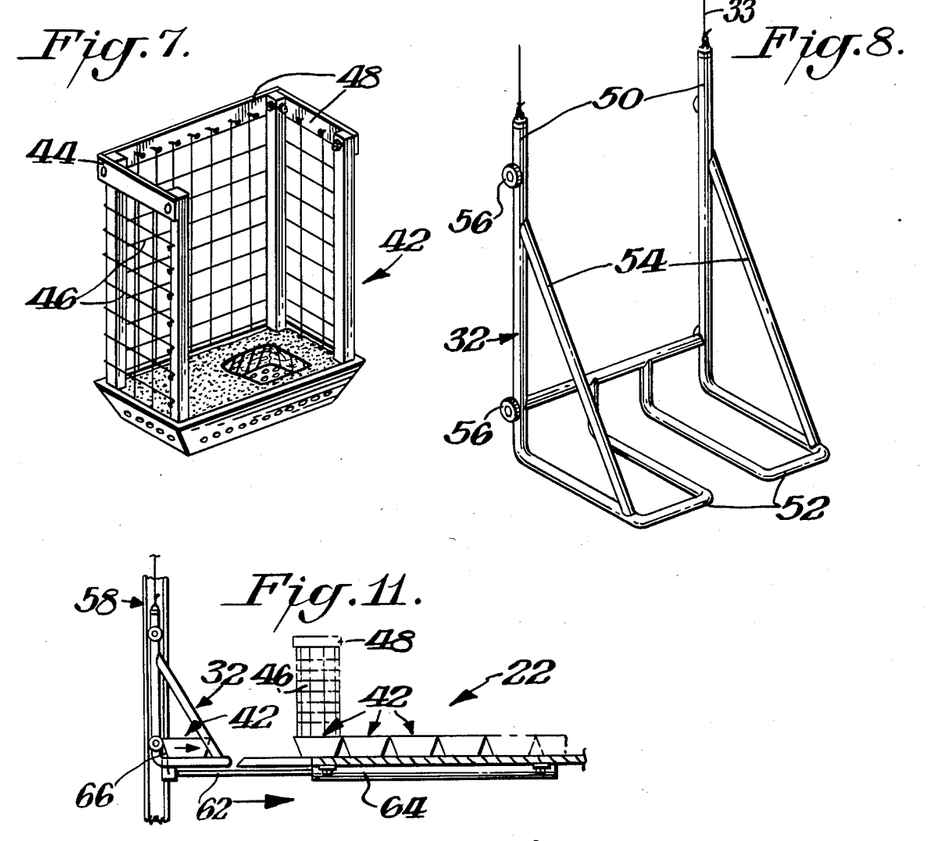
FIG. 7 is a prespective view partly in section of a plant bed shown in FIGS. 1-5.
FIG. 8 is a perspective view of an elevator used in the space garden of FIGS. 1-5.
FIG. 11 is a schematic diagram showing the operation of the plant bed positioning mechanism used in the space garden of FIGS. 1-5.

With the above-noted dimensions, space garden 10 could accommodate in each growing level 40 beds per row, wherein each bed is 60 inches by 28 inches by 10 inches. Each level, in turn, would have 20 rows thus providing 800 beds in each level or 2400 beds in the top light growing area 20 and dark growing areas 22, 24. With each bed 5 feet by 28 inches, the 2400 beds having 20 pounds per tomato plant and 6½ crops per year, the three levels 20, 22, 24 could produce almost 2½ million pounds of tomatoes per year which the yield of fruit on level 26 could be about one-half million pounds per year. As shown in FIG. 7, each bed 42 would be made of a suitable plastic material such as Plexiglas having drain holes at its bottom and sides and suitable support frames 44 made from screen material 46 on posts 48. The bottom of beds 42 would slope inwardly along all four sides to facilitate storage and shipping by permitting the beds to be nested.

Figure 3:
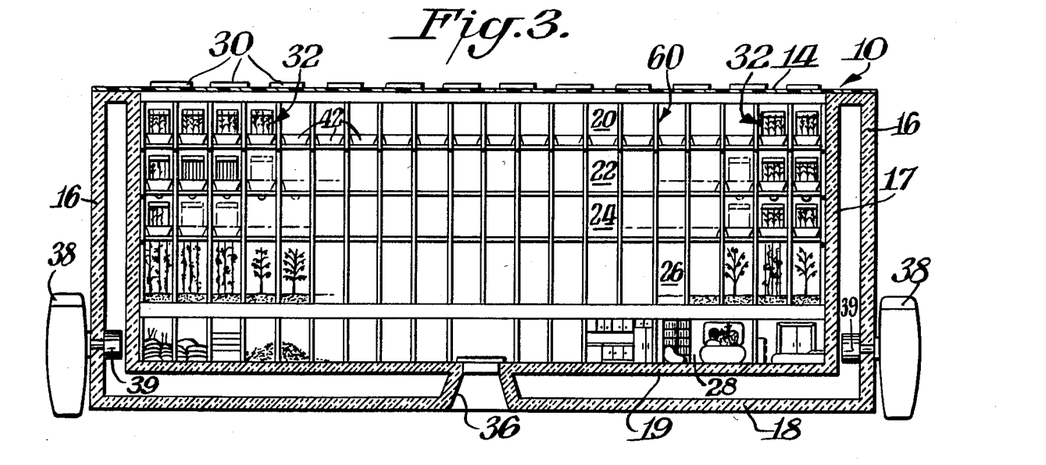

As shown in FIG. 3, the growing areas do not extend completely to the outerwalls 16, 18. Instead a double wall construction having inner walls 17, 19 provide an air space of any desired width which may be used for docking purposes as well as contributing to control of amount of air or oxygen in the housing environment. If the air space is heated from the sun's rays, the hot air will help overcome gravity.

Figure 4:
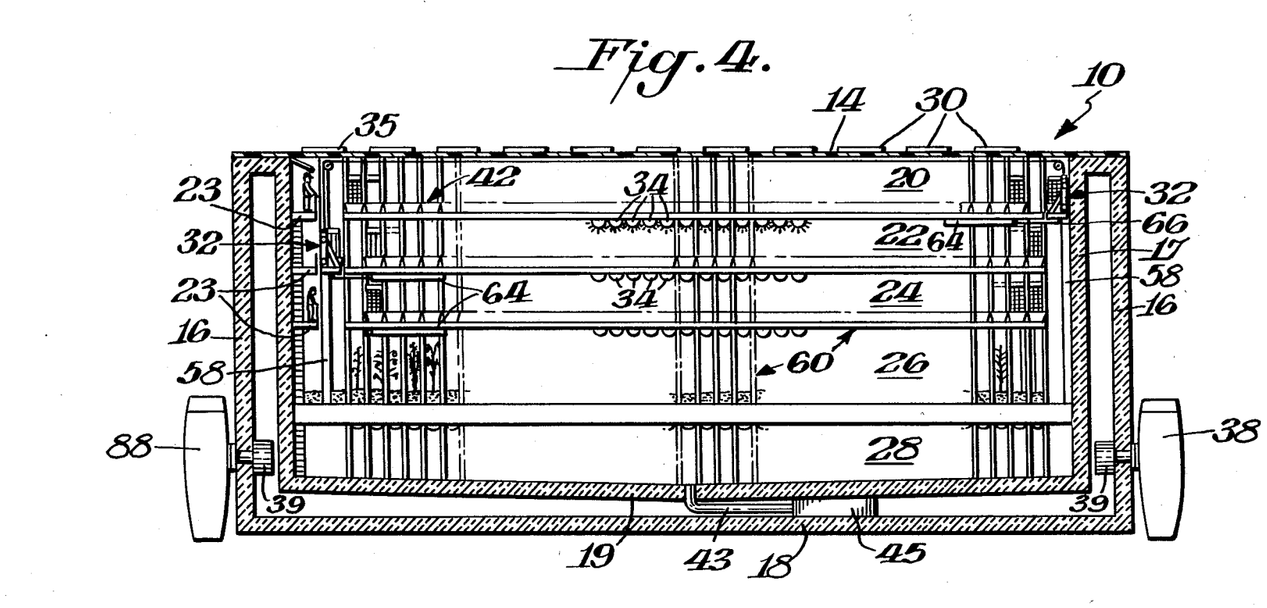

The growing levels would be created by the use of a framework formed from vertical and horizontal studs as illustrated in FIGS. 3 and 4. If the beds are of a maximum dimension of 5 feet, the studs would have to be located a greater distance, such as 5 feet 3 inch centers, to permit insertion and removal of the beds.

Sufficient bracing would be obtained by bracing from stud to stud on all levels from work area end to opposite end. All bracing the other way must be in the outer walls. Beds have to move free from elevator to elevator on levels 20, 22, 24. Level 26 must also be free for workers picking fruit. Bracing in level 26 can be opposite or cross the elevator to elevator direction but only in the top two or three feet at the top of the trees.

Figure 2:
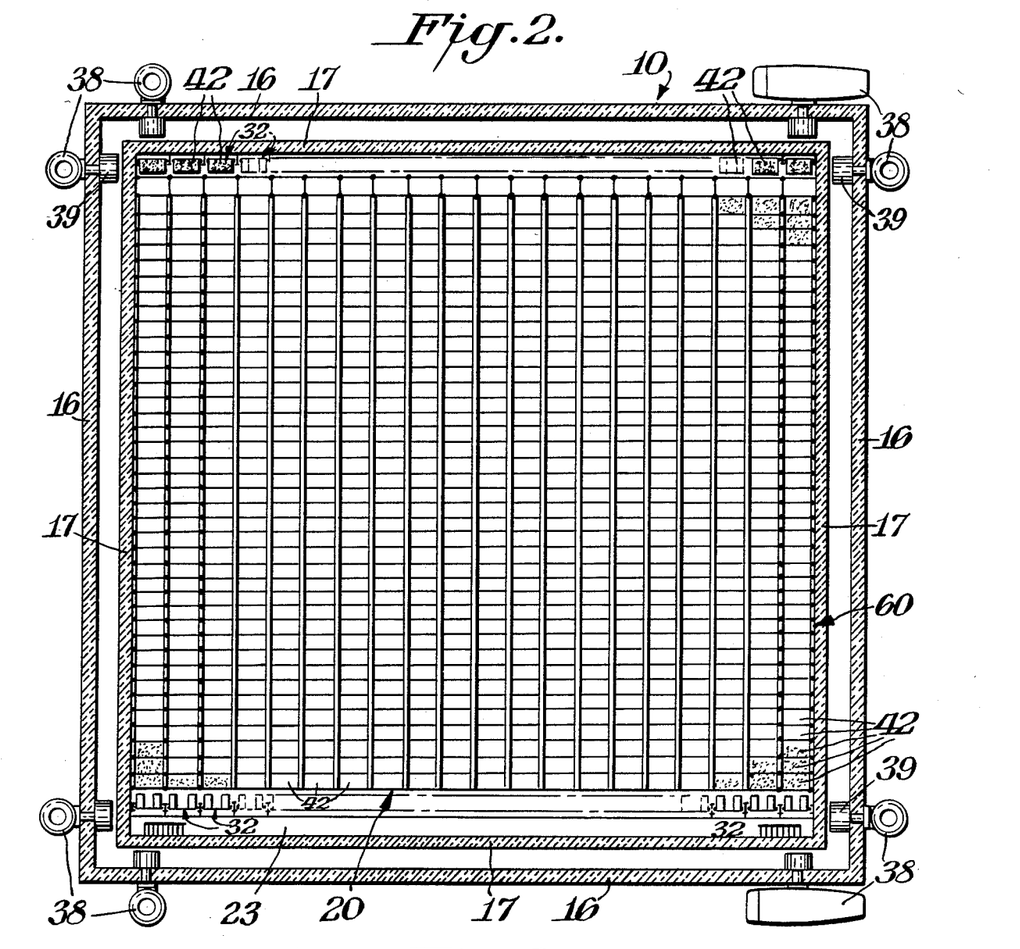
FIGS. 2-4 are cross-sectional views taken through FIG. 1 along the lines 2—2, 3—3 and 4—4, respectively.

Rotation of the beds from one growing level to another could be accomplished as described in my earlier patent. FIGS. 6-10 illustrate a form of elevator which could be used to transport the beds from one level to another. As shown in FIG. 8, each elevator 32 is of generally L-shaped form with a vertical frame 50 and a horizontal frame 52 and with angled support members 54. Wheels 56 are provided on vertical frame 50 for travelling in tracks formed by vertical H-shaped beams 58 at each end of the growing levels. In practice, a pair of elevators would be provided for each as shown in FIG. 2. The beds would be juxtaposed each other in each growing area with a bed being on one of the elevators. Vertical movement of the elevators 32 could be effected in any suitable manner such as by pulleys and cables or racks and pinions.

Figure 9:
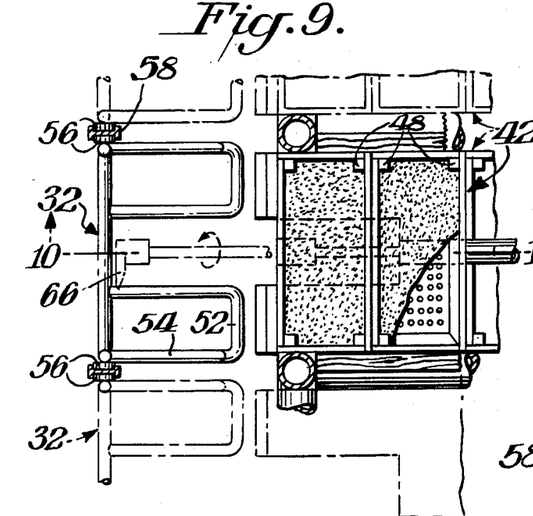
FIG. 9 is a plan view of the elevators shown in FIG. 7.
Figure 10:
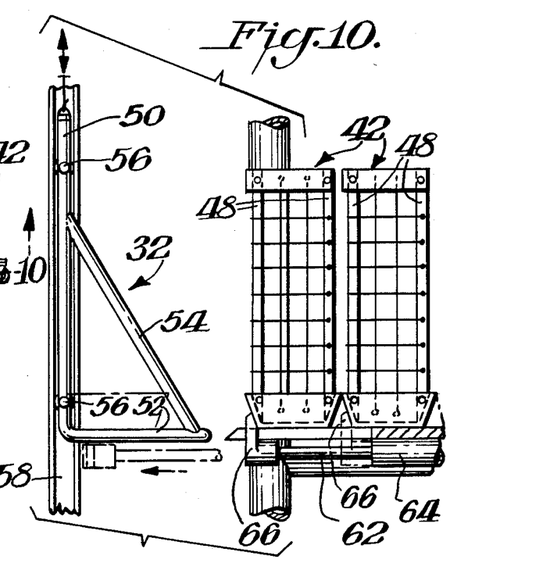
FIG. 10 is a cross-sectional view taken through FIG. 8 along the line 10—10.

Each growing area would include a horizontal bed actuating or positioning device such as a piston cylinder assembly 60. (This would be an alternative to the techniques described in U.S. Pat. No. 3,461,605.) As shown in FIGS. 9-10, assembly 60 includes a piston 62 which would be extended from and retracted into cylinder 64. Piston 62 has an upstanding positioning arm or hook 66 which would move in lower area of open frame 52 of elevator 50. With a bed located on elevator lower frame 52, the elevator 32 would, for example, be raised to be in line with upper growing area 20 as shown in FIG. 2. Piston 62 would be extended so that its actuating or positioning arm 66 would be on the far side of bed 42 (FIG. 10). Through the use of any suitable means such as switches in cylinder 64 actuated by a projection on piston 62, piston 62 could be made to rotate during the course of its travel so that arm 66 would be vertical during its retracting motion while arm 66 would be horizontal during its extension motion when it is being moved to its actuating position. By retraction of piston 62 into cylinder 64, arm 66 would cause bed 42 to move toward the right side of its row, as shown in FIG. 2. In this movement, the bed on elevator 42 would push against the outermost bed on growing level 20, and the various abutting beds 42 on growing level 20 would each be moved to the right, the distance of one bed. In the meantime, right hand elevator 32 would be located adjacent the right hand end of upper level 20 to receive the end bed therefrom. Right hand elevator 32 would then be lowered to the desired lower growing area, and through the use of a similar piston cylinder arrangement, the bed from right hand elevator 32 could be moved onto the appropriate lower growing level with the extreme left hand bed moving on to the left elevator which in the meantime had been lowered to that growing level. If desired, a removable floor may be positioned over the gridlike framework which forms the growing area to assure shade in the dark growing areas and to support the workers should access to the growing areas be desired.

Space garden 10 includes a number of notable features. For example, jet engines or rockets 38 are rotatably mounted so that their orientation can be changed. Thus the jets could be vertically oriented to provide thrust in lifting space garden 10 vertically, and by actuation of motors 39 the orientation of the jets 38 can be changed so that the jets could be utilized for horizontal thrust to maintain space garden 10 in its proper orbit. Space garden 10 may be flown into space under its own power or may be towed into space and then jets 38 could be relied upon to maintain its proper location.

Another feature of space garden 10 is the provision of reflectors 21 adjacent the top wall 14 as shown in FIG. 2 to reflect sunlight away from the workers on platforms 23. The provision of platforms 23 at each growing level in association with the ability to rotate the plants so that each bed can be selectively brought to an end of a growing level permits the workers to have selective access to each bed without requiring the workers to actually move about a growing level.

It is also worth noting that in addition to the provision of solar cells 30 in the top wall 14 of space garden 10 other solar cells may be provided to further utilize the rays of the sun for obtaining power. For example, FIG. 1 illustrates hinged solar panels 31 located at the upper portion of the side walls at the general area where the side walls join to the top wall. The angulation of hinged solar panels 31 may be controlled in any suitable manner to maximize the efficiency of the solar panels.

As shown in FIG. 4, wall or floor 19 is slanted so that any water will be directed to its lowest portion and flow into drain pipe 43 to be collected in reservoir 45.

Figures 6, 13, 14, 15:
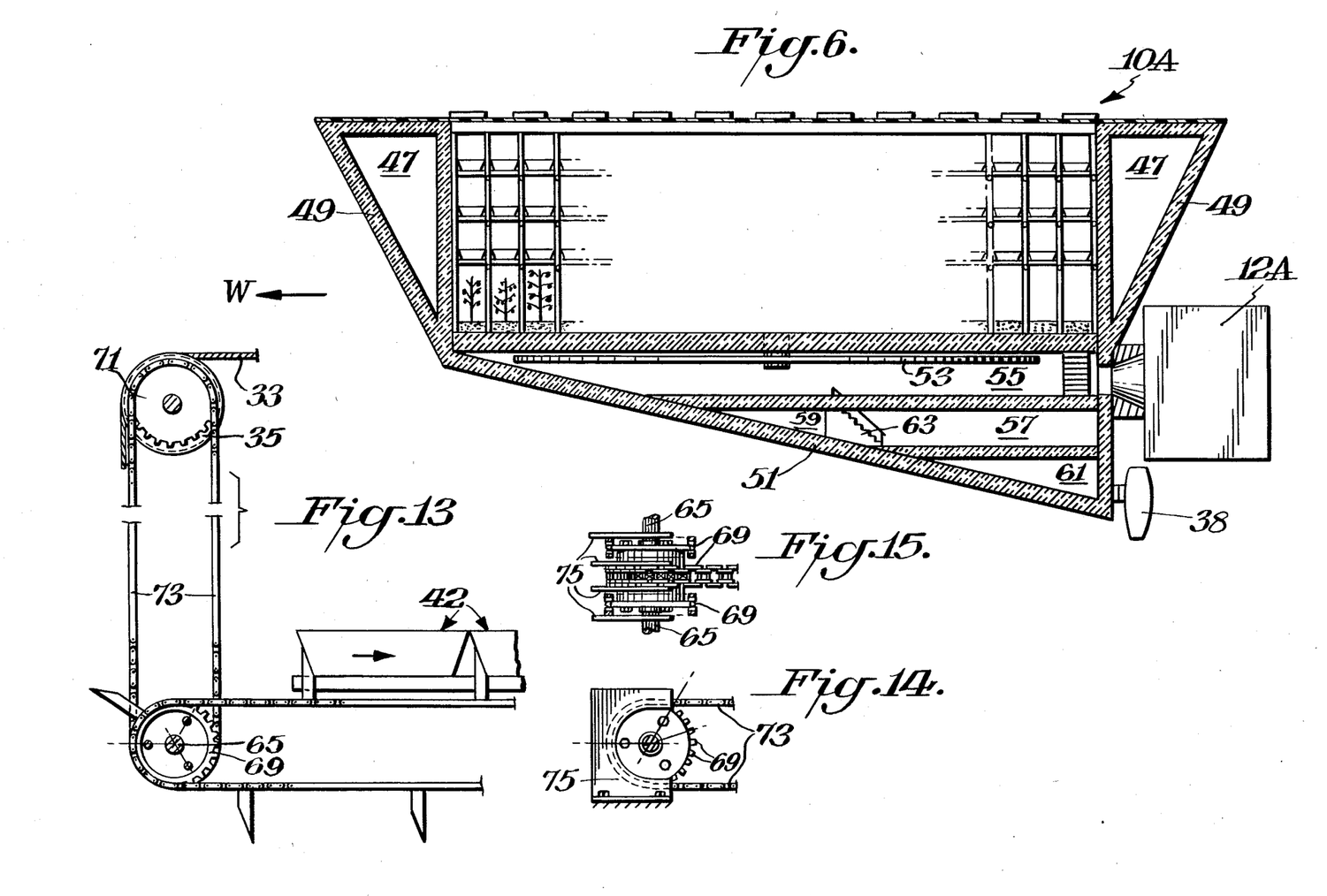
FIG. 6 is a cross-sectional view in elevation of a modified space garden.
FIG. 13 is a side elevation view of a portion of the chain drive with the cover removed.
FIG. 14 is a view similar to FIG. 13 with the cover in place.
FIG. 15 is a top plan view of the portion shown in FIGS. 13-14.

FIG. 6 shows an alternative garden 10A. As shown therein, triangular hot air chambers 47 are provided which with their sloping walls 49 and sloping wall 51 give lift to garden 10A. Garden 10A would also include a large rapidly rotating wheel 53 which would give stability and balance to garden 10A.

FIG. 6 also illustrates a variation where capsule 12A side docks instead of bottom docking as in FIG. 1.

In addition, garden 10A includes various areas 55, 57, 59, 61 which would be used as living quarters and/or work or storage areas. Stairs 63 are also provided.

For safety reasons, the beds are interconnected by endless chains, belts, cables or the like to assure that as the beds are being rotated there will be no excess sidewards movement. For example, the beds in levels 20 and 22 may be interconnected by an endless chain, while the beds on level 24 would be interconnected by a chain section bolted tight to studs at the end of their row. When level 20 is to be rotated in association with level 24, the endless chain could be interrupted to detach the section at level 22 and attach the section at level 24 to level 20 to re-form an endless chain.

Figure 12:
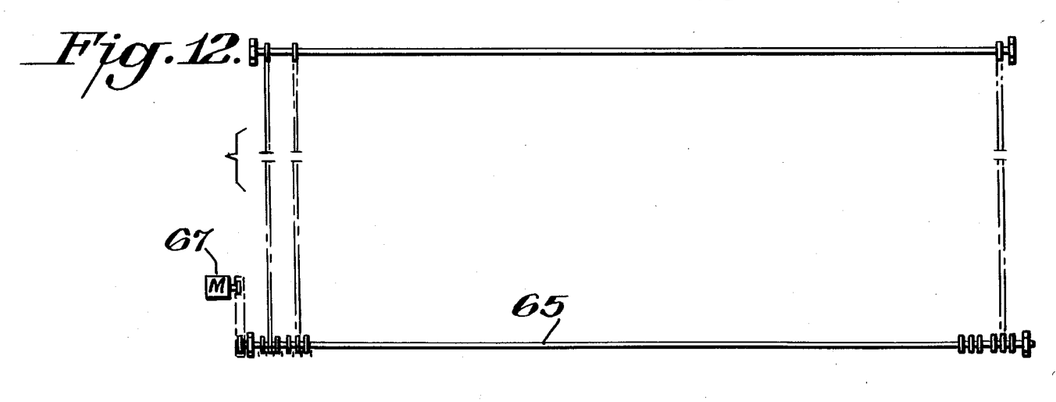
FIG. 12 is a schematic layout of a chain drive usable in the space garden.

As schematically shown in FIG. 12, a main drive shaft 65 would extend the entire 105 foot length of a wall and would be located at any level such as level 20. Shaft 65 would rotate very slowly, such as one revolution every six minutes. During each revolution a number of functions would be performed. One function is to move each bed forward one space (i.e., 28 inches) to move the endmost bed on to the elevator. At the same time the endless chain would move all of the other beds on the other interconnected level and cause the endmost bed at the opposite end to move on to the opposite elevator. Another function would then be to move one elevator up and the other one down for shifting the level of the endmost beds. Although FIG. 12 shows only one motor 67, any suitable number of motors, such as one every ten feet, to give even power with less torque and continue shaft rotation if a motor should fail.

Every section of vertically aligned beds would have its own set of elevators which would operate at different times from each other to stagger the work load. Workers could interrupt operation of any set to permit attention to be given as needed in that section. The functions for each section as performed by shaft 65 would be accomplished through the use of a series of segmental sprockets 69 on shaft 65 as shown in FIGS. 13-15. The segmental sprockets 69 are mounted on shaft 65 spaced from each other but bolted together for joint rotation on shaft 65. Sprockets 69 are mounted in a staggered fashion such that, for example, if teeth were provided along one-third the periphery of three sprockets, the composite set of sprockets would have its teeth around a full 360° arc. The teeth of each segmental sprocket 69 would engage and drive a different chain 73. One chain could control bed movement, others could cause an elevator to move up and down. For safety reasons, as shown in FIGS. 14-15, fixed covers 73 are provided between and against the sprockets 69 to maintain the chains 73 mounted thereon. As also illustrated in FIG. 13, cable 33 is disposed around pulley 35 for raising and lowering the elevators with pulley 35 being driven by an appropriate chain 73 which drives a sprocket 71 coaxially with pulley 35.

If the beds are interconnected, it is possible to leave a space between selected beds such as by omitting every other bed, and the beds could still be moved for rotation purposes. By aligning the open spaces in all levels the sun would shine into selected portions of level 26. This would be recommended every couple of weeks to interrupt the cold dormant condition of the fruit trees and grapevines when they are to be pruned.

As can be appreciated, the space garden 10 thus provides an environment for the growing of plants which maximizes growing conditions by growing the plants totally independent of the conditions existing on earth. This can be achieved through the use of known space technology such as used in launching and positioning of satellites as well as technology involved in docking capsules to such satellites. Thus the invention provides a potential for greatly alleviating the problems and concerns relating to food shortages on earth.

What is claimed is:

1. In a method of growing plants comprising transporting a space garden into space by flying the space garden in a western direction at generally the same speed as the earth rotates in an eastern direction to a location between the earth and the sun, maintaining the space garden between the earth and the sun whereby the earth rotates on its own axis below the space garden while the space garden remains between the sun and the rotating earth with the space garden being in perpetual sunshine, providing a plurality of horizontal growing levels in the space garden with one level being adjacent the top wall of the space garden to receive light therethrough and thereby comprise a light growing area and with the remaining levels being for dark growing, and periodically rotating plants to and from the light and dark growing areas.

2. The method of claim 1 including rotating the plants by moving the plants in one growing area while automatically moving the plants in another growing area.

3. The method of claim 1 including utilizing solar cells in the top wall of the space garden to provide power for the space garden.

4. The method of claim 1 including providing a plurality of dark horizontal growing areas vertically displaced from each other, and periodically rotating the plants to and from the light and the plurality of dark growing areas.

5. The method of claim 1 including providing a further area below the lowermost growing area to function as living quarters and as a storage and work area.

6. The method of claim 1 including providing at least one docking area on the space garden, and periodically docking a space capsule at the docking area.

7. The method of claim 1 including maintaining the space garden generally over the equator during at least a portion of the time.

8. The method of claim 1 including providing a vertically movable elevator at each end of the levels to permit the rotation of plants from one level to another.

9. The method of claim 8 including providing a piston cylinder assembly, the piston of the assembly having an upstanding positioning arm, and rotating the piston to vary the orientation of the arm.

10. The method of claim 9 including providing each of the growing levels with at least one row of plant beds, and the beds abutting each other whereby a pushing movement of one bed causes the remaining beds to move.

11. The method of claim 10 including providing a plurality of rows of plant beds in each of the growing levels, and a piston cylinder assembly being provided for each set of rows.

12. The space method of claim 11 wherein the side and bottom walls of the space garden are of double wall construction, and providing an air space therebetween.

13. The method of claim 1 including providing each of the growing levels with at least one row of plant beds, and interconnecting the beds in each row by chain means.

14. The method of claim 13 including selectively connecting the chain means in the uppermost level with the chain means in one of the other levels to thereby create an endless chain for interconnecting the beds in the uppermost level and with one of said other levels.

15. In a method of growing plants comprising transporting a space garden into perpetual sunshine by flying the space garden in a western direction at generally the same speed as the earth rotates in an eastern direction to a location between the earth and the sun, maintaining the space garden between the earth and the sun whereby the earth rotates on its own axis below the space garden while the space garden remains between the sun and the rotating earth with the space garden being in perpetual sunshine, providing a plurality of horizontal growing levels in the space garden with one level being adjacent the top wall of the space garden to receive light therethrough and thereby comprise a light growing area and with the remaining levels being for dark growing, periodically rotating plants to and from the light and dark growing areas, and obtaining water for the space garden from cumulus clouds after the pollution has been rained out of the bottom portion of the clouds.

* * * * *

UNITED STATES PATENT AND TRADEMARK OFFICE
CERTIFICATE OF CORRECTION

PATENT NO. : 4,583,321
DATED : April 22, 1986
INVENTOR(S) : Lawrence Edward Stanhope It is certified that error appears in the above-identified patent and that said Letters Patent is hereby corrected as shown below:

Cover page, line [76],

Inventor: "Lawrence E. Stanhope, c/o Connolly and Hutz, P.O. Box 2207, Wilmington, Del. 19899-2207"

should read:

-- Lawrence Edward Stanhope, 223 Windsor Street, Lakeland, FLA. 33803 --

Signed and Sealed this

Sixteenth Day of September 1986

[SEAL]

Attest:

DONALD J. QUIGG

Attesting Officer     Commissioner of Patents and Trademarks